United States Patent [19]

Watanabe

[11] 4,392,561
[45] Jul. 12, 1983

[54] DISC BRAKE

[75] Inventor: Mamoru Watanabe, Tokyo, Japan

[73] Assignee: Watanabe Engineering Co., Ltd., Tokyo, Japan

[21] Appl. No.: 160,235

[22] Filed: Jun. 17, 1980

[30] Foreign Application Priority Data

Jun. 28, 1979 [JP] Japan .............................. 54-88653[U]

[51] Int. Cl.³ ............................................ F16D 65/00
[52] U.S. Cl. ................................................. 188/73.36
[58] Field of Search ................ 188/73.5, 73.3, 205 A, 188/71.1, 72.4, 73.36, 73.37, 73.38

[56] References Cited

U.S. PATENT DOCUMENTS

| 3,768,605 | 10/1973 | Carre | 188/73.5 |
| 4,044,864 | 8/1977 | Karasadani | 188/73.36 |
| 4,049,087 | 9/1977 | Heinz et al. | 188/73.5 |
| 4,060,154 | 11/1977 | Smith | 188/73.38 |

FOREIGN PATENT DOCUMENTS

| 1967110 | 10/1977 | Fed. Rep. of Germany | 188/73.38 |
| 2745947 | 4/1978 | Fed. Rep. of Germany | 188/73.38 |
| 2751673 | 5/1978 | Fed. Rep. of Germany | 188/73.38 |
| 2854810 | 6/1979 | Fed. Rep. of Germany | 188/73.3 |
| 50-98825 | 8/1975 | Japan | 188/73.3 |

Primary Examiner—Trygve M. Blix
Assistant Examiner—Thomas J. Brahan
Attorney, Agent, or Firm—Cantor and Lessler

[57] ABSTRACT

A disc brake has a structure for supporting the friction pads in which a caliper body including a bridge section extending over a disc and first and second arm sections is provided with a pad spring for resiliently holding the upper portions of the friction pads to come in pressure contact with the sliding plane of the disc. The friction pads are provided at the upper parts of the backing plates thereof with recesses or projections, and the pad spring is constructed from a holder and a bent extension located at its center. The holder is resiliently caused to engage fixedly with the inner side walls or the inner upper walls of the bridge section, and the bent extension is kept in contact with at least the side wall of the recesses or projections positioned on the side out of which the disc rotates, whereby the friction pads are held under pressures against the torque-receiving portion of a bracket located on the side out of which the disc rotates, and are forced in the direction of the rotating shaft of the disc.

4 Claims, 10 Drawing Figures

DISC BRAKE

BACKGROUND OF THE INVENTION

The present invention relates to a disc brake, and more particularly to a structure for supporting the friction pads in a disc brake, in which a caliper body including a bridge section extending over a disc and first and second arm sections is provided with a pad spring for resiliently holding the upper portions of the friction pads in pressure contact with the sliding plane of the disc.

In the above-mentioned type of the structure for supporting the friction pads in a disc brake which has been put to practical use in the art, the vertical vibrations of the friction pads are only prevented to some extent by allowing the upper portions thereof to be resiliently retained by a pad spring. However, any horizontal vibrations or movement of the friction pads cannot be avoided by said pad spring, since a space or room has to be left between the sides of the friction pads and the allied bracket or the torque-receiveing portions of the caliper body in the course of production. This was responsible for clanking, brake squealing or local wearing. Especially when braking is effected, the switchover of the brake from the backward to the forward direction and vice versa causes the sides of the friction pads to strike on the torque-receiving portions so that a clanking noise is generated, since no restriction is imposed on the movement of the pads relative to the rotating direction of the disc. Such a noise is then resonant with the overall brake unit and gives a driver an uneasy feeling, thus rendering the brake unit unpreferable.

SUMMARY OF THE INVENTION

It is an object of the present invention to provide a solution for the above-mentioned problems.

More particularly, it is a main object of the present invention to provide an improved structure for supporting the friction pads in a disc brake which reduces or substantially eliminates a clanking noise, a bad sliding of the friction pads, a brake squeal and local wearing and thus ensures stable braking performance.

This object is achieved by permitting the sides of the friction pads to be always held under pressures against the torque-receiving portion of the caliper body located on the side out of which the disc rotates by means of a pad spring while maintaining a spring load in the longitudinal direction, so that the movement of the friction pads in the rotating direction of the disc is restricted during braking by the spring force, thus eliminating the generation of a clanking noise due to the collision of the friction pads with the troque-receiving portion upon switchover of the brake from the backward to the forward direction and vice versa, and preventing any vibration and movement of the friction pads.

According to the present invention, there is provided a disc brake having a structure for supporting friction pads in which a caliper body including a bridge section extending over a disc and first and second arm sections is provided with a pad spring for resiliently holding the upper portions of the friction pads to come in pressure contact with the sliding plane of the disc, characterized in that said friction pads are provided at the upper parts of the backing plates thereof with grooves or ribs, and said pad spring is constructed from holder means and a bent extension located at its center, said holder means being resiliently caused to engage fixedly with the inner side walls or upper wall of said bridge section, and said bent extension being kept in contact with at least the side wall of said grooves or ribs, positioned on the side out of which the disc rotates, whereby by said friction pads are held under pressures against the torque-receiving portions of a bracket or the caliper body, positioned on the side out of which the disc rotates, and are forced in the direction of the rotating shaft of the disc.

The above-mentioned and other objects and advantages of the present invention, together with structural variations, will become apparent to those skilled in the art upon reference to the detailed description in the following specification in conjunction with the illustrations in the accompanying drawings of preferred embodiments, it being understood that such variations are comprehended within the scope and sprit of the invention.

Throughout the drawings, like reference characters are employed to designate like parts.

FIGS. 1 to 5 illustrate a version of one embodiment of the present invention, which is applicable to a disc brake of the type designed to slidingly support the friction pads from a bracket in a suspensory manner, FIG. 1 being a front view thereof;

FIG. 2 being a plan view thereof;

FIG. 3 being a sectional view taken along the line III—III of FIG. 2;

FIG. 4 being a sectional view taken along the line IV—IV of FIG. 2; and

FIG. 5 being a sectional view taken along the line V—V of FIG. 1;

FIGS. 8 to 10 illustrate another embodiment of the present invention which is applicable to a disc brake of the type designed to suspensorily support the friction pads from a caliper body by means of hunger pins, wherein FIG. 8 is a sectional view thereof;

FIG. 9 is a sectional view taken along the line IX—IX of FIG. 8; and

FIG. 10 is a perspective view showing the pad spring used therein.

DETAILED DESCRIPTION OF PREFERRED EMBODIMENTS

Figure 1:
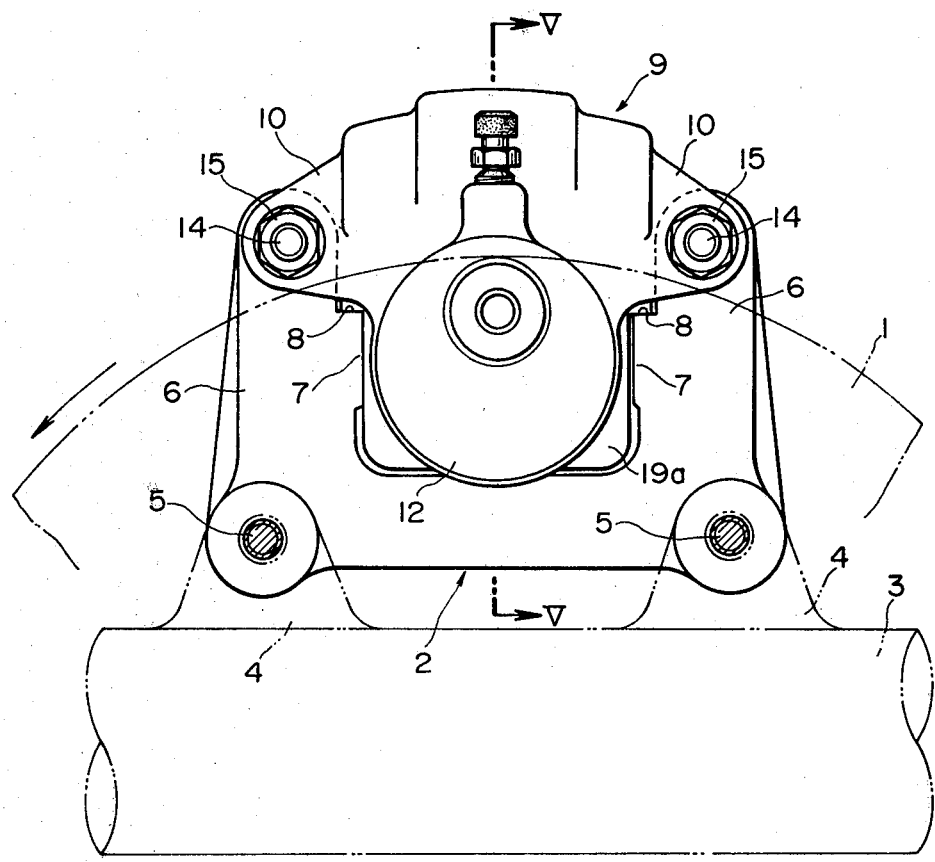
Figure 4:
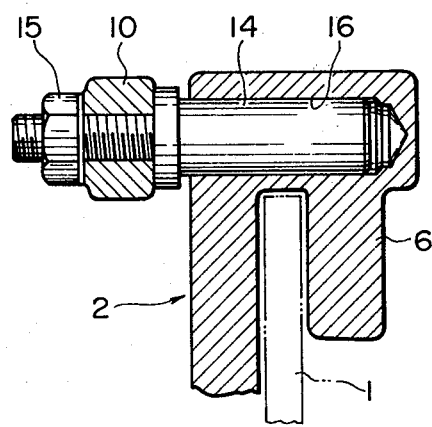
Figure 2:
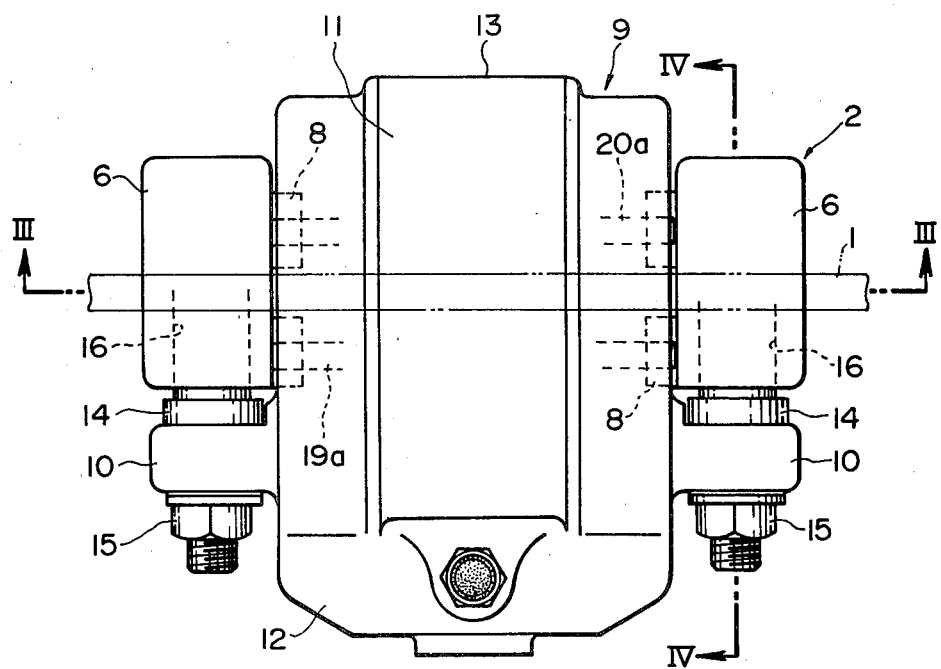

Referring now to FIGS. 1 to 5 and 7, there is shown a disc brake of the type in which the friction pads are slidingly supported from a bracket in a suspensory manner. In these figures, reference character 1 denotes a disc which rotates with the wheels, and 2 a bracket to be fixed on the body of a vehicle, which is bolted at 5, 5 to fittings 4, 4 formed on a fork 3. The bracket 2 includes arm sections 6 and 6 having torque-receiving portions 7 and 7 in the face to face relation, each of said portions being horizontally provided with a pair of guides 8 and 8.

A caliper body generally shown at 9 having fittings 10 and 10 is arranged to extend or stride oer the disc 1 through a bridge section 11, and is provided as integral pieces with first and second arm sections 12 and 13. Slide pins 14 and 14 are fixed to the fittings 10 and 10 by nuts 15 and 15, and are slidingly inserted into pin holes 16 and 16 provided in the arm sections 6 and 6 of the bracket 2 so that the caliper body 9 is movably supported relative to the bracket 2.

Figure 5:
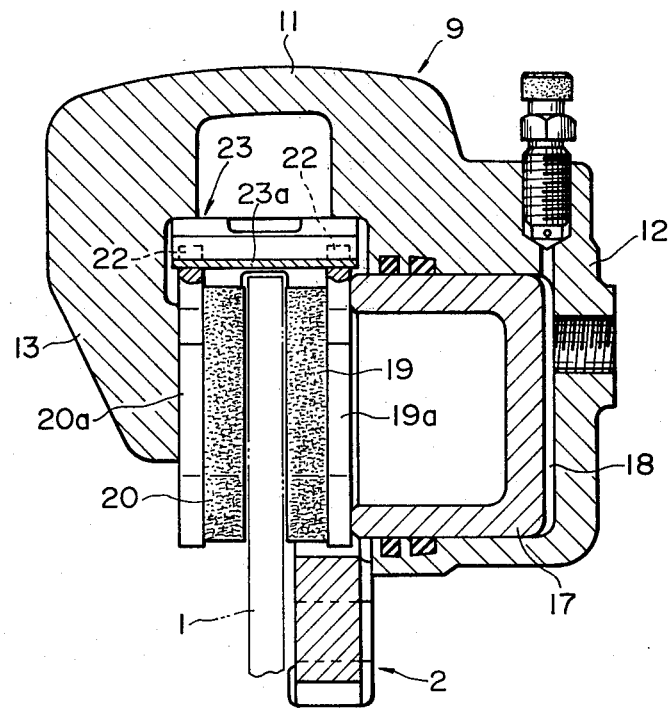

A working piston 17 is slidingly housed in a cylinder 18 formed in the first arm section 2, as will be best seen from FIG. 5. First and second friction pads 19 and 20 are disposed on both sides of the disc 1, and include backing plates 19a and 20a, respectively. These pads are slidingly supported suspensorily from the guides 8 and 8 by supporting sections 21 and 21 projecting from the right and left sides of the plates 19a and 20a.

Figure 7:
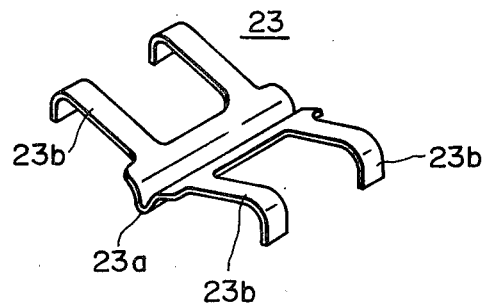
FIG. 7 is a perspective view showing the pad spring used in both versions.

Recessed or grooved portions shown at 22 are provided in the upper parts of the backing plates 19a and 20a of the first and second friction pads. A pad spring 23 is provided at its center with an extension 23a which is bent downwards along the axial direction of the disc 1, as best shown in FIG. 7. This extension 23a is provided on its right and left sides with holder means 23b and 23b, respectively, with their points being bent downward.

Figure 3:
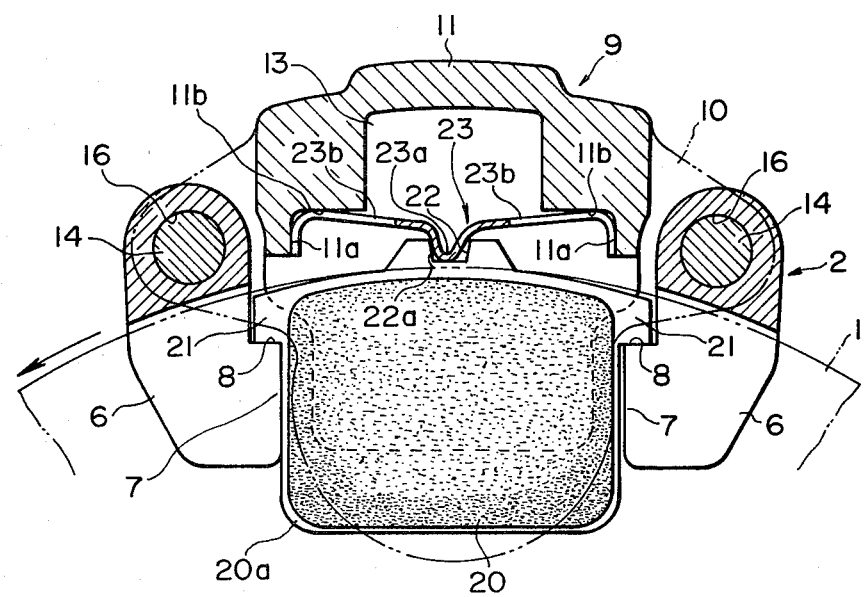

The points of two sets of the holder means 23b and 23b are resiliently caused to engage fixedly with both side walls 11a and 11a of the bridge section 11 into and out of which the disc 1 rotates and upper walls 11b and 11b thereof, as best shown in FIG. 3. At the positions where the sides of the backing plates 19a and 20a of the first and second friction pads come in abutment with the torque-receiving portion 7 positioned on the side out of which the disc 1 rotates, the bent extension 23a of the pad spring 23 is allowed to be in engagement with the side walls 22a of the grooves 22 in the backing plates 19a and 20a of the first and second friction pads, located on the side out of which the disc rotates, so that the first and second friction pads 19 and 20 are urged down under the spring force of the pad spring 23, and are retained under pressure against the torque-receiving portion 7, located on the side out of which the disc rotates.

Figure 6:
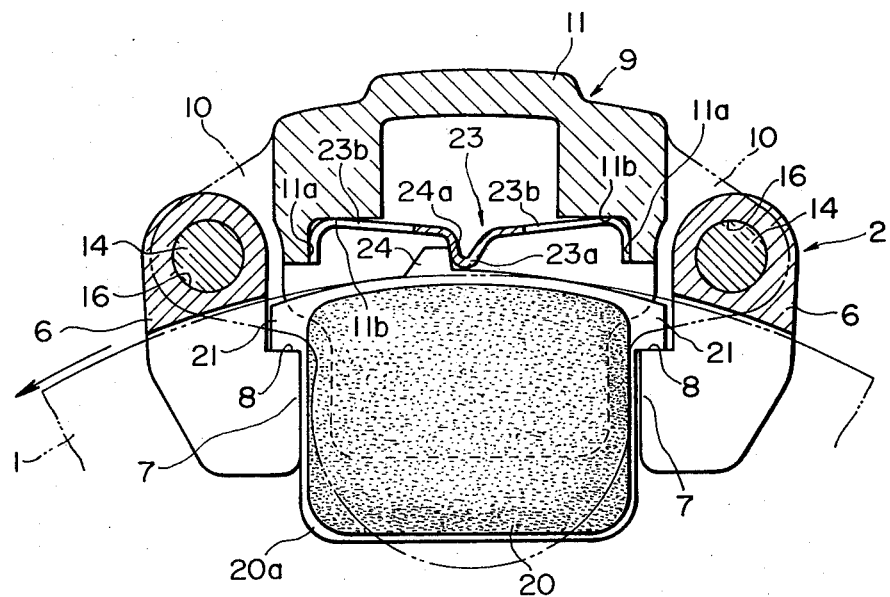
FIG. 6 is a sectional view showing another version of the first embodiment.

Referring next to FIG. 6, there is illustrated another embodiment of the disc brake of the same type as in the first embodiment.

In the second embodiment, the backing plates 19a and 20a of the first and second friction pads 19 and 20 each are provided at its upper part with a projection or rib 24. The bent extension 23a of the pad spring 23 is allowed to abut against the side walls 24a of both ribs 24 on the side into which the disc rotates, whereby both friction pads are resiliently held against the torque-receiving portion 7 in the same manner as in the first embodiment.

It will be understood that, although the pad spring 23 has been described as being resiliently held against both sides walls 11a and 11a as well as both upper walls 11b and 11b, it may be resiliently retained between one side wall or upper wall and the grooves 22 or ribs 24 of the friction pads.

Figure 8:
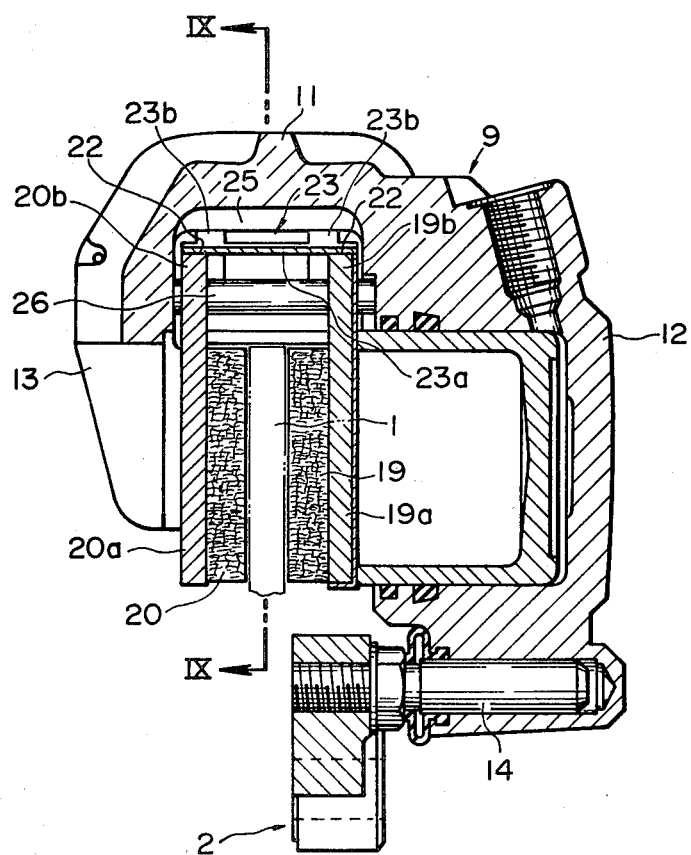
Figure 9:
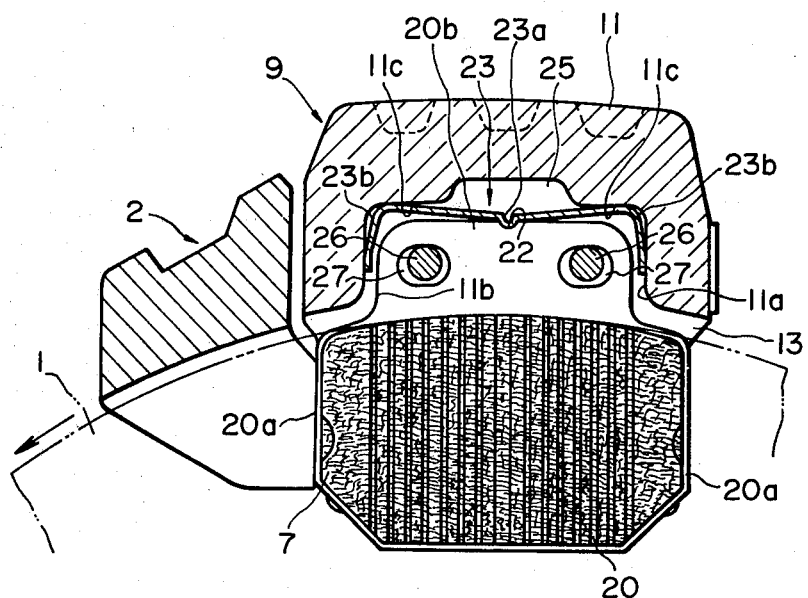
Figure 10:
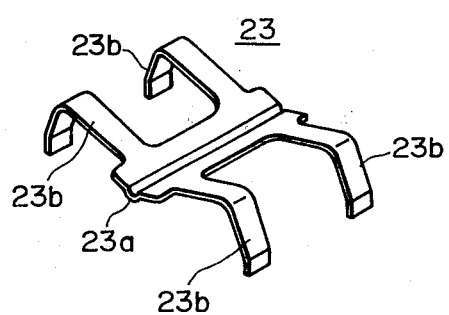

Turning now to FIGS. 8 and 10, there is illustrated one embodiment of the disc brake wherein the friction pads are suspensorily supported from the caliper body by means of hunger pins.

A bracket generally shown at 2 is designed such that it only extend over a disc 1 on the side out of which the disc rotates, i.e., on the side where it is fixed to the body of a vehicle, rather than on the side into which the disc rotate. The bracket includes a torque-receiving portion 7 against which abuts only one edge of the backing plate 20a of the second friction pad 20 and a torque-receiving portion against which does only one edge of the backing plate 19a of the first friction pad 19 (the latter portion being positioned in symmetry with the former), respectively. The caliper body 9 movably supported on the bracket 2 by means of a slide pin 14 has the bridge section 11 extending over the disc 1 and the first and second arm sections 12 and 13 formed integrally therewith. The bridge section 11 is provided in its side with a recessed portion 25 having a substantially U-shaped cross section.

A pair of hunger pins 26 inserted through the caliper body 9 are passed in the recessed portion 25 through a pair of loose pin holes 27 in the rotating direction of the disc 1, said holes being formed in the pad-supporting sections 19b and 20b of the backing plates 19a and 20a. Thus, the pad-supporting sections 19b and 20b are located within the recessed portion 25 so that both pads 19 and 20 are suspensorily supported from the caliper body 9, as will be understood from FIG. 8. Spring 23 is allowed to engage touchingly with the backing plates 19a and 20a at one point or region. Thus, assembling of the friction pads 19 and 20 is made more easy.

It will be understood that while the third embodiment employs the pad spring 23 provided at its center with the extension 23a which is bent downward and along the axial direction of the disc, use may be made of an upwardly bent extension which is then allowed to engage touchingly with the ribs formed on the backing plates.

It will also be understood that the concepts of the present invention are equally applicable to a disc brake of the type designed to receive torques on the caliper body.

As will be seen from the foregoing description, the friction pads are held under pressures against the torque-receiving portions of the bracket or caliper body by the spring force of a pad spring while maintaining a spring load in the longitudinal direction, and the pad spring is provided with a bent extension in the form of a rib along the alxial direction of the disc, so that the strength of the pad spring with respect to bending is increased and the pressures exerted by the friction pads are stabilized. Thus, the resulting rib effect prevents deflection of the pad spring caused upon braking, and the spring force imposes restriction upon movement of the friction pads in the rotating direction of the disc during braking. This lowers or alleviates a clanking noise produced due to the collision of the friction pads with the torque-receiving portions taking place upon switchover of the brake from the backward to the forward direction. Even if the movement of the friction pads takes place in the course of braking in the backward direction, such movement is restricted by the torque-receiving portions provided on the side opposite there to or the hunger pins. Thus, there is no fear that the pad spring may deform. This means that, upon braking, the friction pads return to their original position, thus rendering the location thereof more easy. In a normal state, there is no possibility that the friction pads may be forced toward the disc side by deflection of the pad spring, since such deflection of the pads caused as by braking is prevented the rib effect. Thus, any movement of the pads together with the disc is effectively avoided. The pad spring also holds positively the friction pads under pressure, thus eliminating or suppressing a clanking noise, a bad sliding of the friction pads, a brake squeal and local wearing which are caused by horizontal or vertical vibrations and rocking movements of the friction pads. This gives the brake unit more satisfactory performance.

Furthermore, prevention of the vertical or horizontal vibrations of the friction pads is easily achieved only by allowing the bent extension of the pad spring to be in abutment engagement with at least the side wall of the groove or projections of the backing plates of the friction pads, located on the side out of which the disc rotate. Replacement of the friction pads are also readily carried out, since such engagement is accomplished at one point or region.

What is claimed is:

1. A disc brake having a structure for supporting first and second friction pads mounted on backing plates, comprising a caliper body including a bridge section extending over a disc and first and second arm sections depending on either side of said pads, each arm section having a torque receiving portion with a horizontal shoulder, and a pad spring for resiliently holding the upper portions of the friction pads to come in pressure contact with the sliding plane of the disc, said friction pad backing plates comprising supports resting on said shoulders and means for contacting said spring, each said contacting means comprising at least one upwardly extending projection defining a non-centered side wall, said pad spring comprising a generally H-shaped, in plan view, unitary leaf spring having a longitudinal central body portion spanning said disc and said first and second pads, said central body portion being downwardly bent to form a depending longitudinal rib, and a pair of oppositely outwardly extending arms at each end of said central body portion, each arm terminating in a depending finger, said fingers being resiliently caused to engage fixedly with the inner side walls of said bridge section, and said rib being kept in contact with at least said side wall of said projection positioned on the side out of which the disc rotates, whereby said friction pads are held under pressure against the torque-receiving portions of a bracket, located out of which the disc rotates, and are forced in the direction of the rotating shaft of the disc.

2. A disc brake as recited in claim 1, in which each said contacting means comprises a pair of said projections defining a recessed portion between the same.

3. A disc brake as recited in claim 2, wherein the fingers of said pad spring are resiliently caused to engage fixedly with the inner upper walls of said bridge section.

4. A disc brake as recited in claim 1, in which each said contacting means comprises one said projection formed on the upper part of the respective backing plate of each of said friction pads, said projections being allowed to engage with the downwardly bent rib of said pad spring.

* * * * *